United States Patent [19]

Im

[11] Patent Number: 5,969,773
[45] Date of Patent: Oct. 19, 1999

[54] DEVICE FOR REVERSING AN IMAGE OF AN OBJECT

[75] Inventor: Jae-Hee Im, Seoul, Rep. of Korea

[73] Assignee: Samsung Aerospace Industries, Ltd., Kyeongsangnam-do, Rep. of Korea

[21] Appl. No.: 08/804,190

[22] Filed: Feb. 21, 1997

[30] Foreign Application Priority Data

Feb. 28, 1996 [KR] Rep. of Korea .......................... 96-5051

[51] Int. Cl.⁶ ...................................................... H04N 9/64
[52] U.S. Cl. ............................ 348/714; 348/715; 348/718
[58] Field of Search .................................. 348/714, 715, 348/716, 718, 719, 720, 722; H04N 9/64

[56] References Cited

U.S. PATENT DOCUMENTS

| 4,183,063 | 1/1980 | Lewis ........................................ 348/766 |
| 4,323,926 | 4/1982 | Newman .................................. 348/776 |
| 4,757,388 | 7/1988 | Someya et al. .......................... 348/211 |
| 5,278,662 | 1/1994 | Womach et al. ......................... 348/722 |
| 5,721,586 | 2/1998 | Shimamura et al. ...................... 348/61 |
| 5,841,475 | 11/1998 | Kurihara et al. ......................... 348/409 |

Primary Examiner—Tommy P. Chin
Assistant Examiner—Nhon T Diep
Attorney, Agent, or Firm—Finnegan, Henderson, Farabow, Garrett & Dunner, L.L.P.

[57] ABSTRACT

A device for reversing an image of an object includes selector for selecting a reverse mode and control signal generator for generating a plurality of control signals. The control signal generator outputs a down-counting signal when the reverse mode is selected. A memory stores image data when the memory receives a store-enable control signal from the control signal generator and outputs the stored image data when the memory receives an output-enable control signal from the control signal generator. The device also includes an address generator for generating an address at which the image data is stored in the memory according to a control signal received from the control signal generator. During the reverse mode, the address generator generates an address to sequentially access the memory, beginning with a last address of the memory according to the down-counting signal.

16 Claims, 7 Drawing Sheets

FIG.8A

| | EVEN FIELD | | ODD FIELD | | |
|---|---|---|---|---|---|
| OH' | G | Mg | G | Mg | OH |
| | Cy | Ye | Cy | Ye | |
| | Mg | G | Mg | G | 1H |
| 1H' | Cy | Ye | Cy | Ye | |
| | G | Mg | G | Mg | 2H |
| | Cy | Ye | Cy | Ye | |
| | S1 | S2 | S1 | S2 | |

FIG.8B

| | EVEN FIELD | | ODD FIELD | | |
|---|---|---|---|---|---|
| OH' | Ye | Cy | Ye | Cy | OH |
| | G | Mg | G | Mg | |
| | Ye | Cy | Ye | Cy | 1H |
| 1H' | Mg | G | Mg | G | |
| | Ye | Cy | Ye | Cy | 2H |
| | G | Mg | G | Mg | |
| | S1 | S2 | S1 | S2 | |

FIG.8C

| | EVEN FIELD | | | | Delete LINE | ODD FIELD |
|---|---|---|---|---|---|---|
| OH' | Cy | Ye | Cy | Ye | Cy | OH |
| | Mg | G | Mg | G | Mg | |
| | Cy | Ye | Cy | Ye | Cy | 1H |
| 1H' | G | Mg | G | Mg | G | |
| | Cy | Ye | Cy | Ye | Cy | 2H |
| | Mg | G | Mg | G | Mg | |
| | S1 | S2 | S1 | S2 | | |

DEVICE FOR REVERSING AN IMAGE OF AN OBJECT

BACKGROUND OF THE INVENTION

1. Field of the Invention

The present invention relates to a device for reversing an image of an object. More particularly, the present invention relates to a device for reversing an image of an object displayed using a video display system.

2. Description of the Prior Art

Video display systems commonly include a CCD (Charge Coupled Device) for converting an optical image of an object into an electrical signal. A display device, such as a monitor or television, receives the electrical signal and transforms it into an image.

The CCD consists of pixels which pick up the optical image and sequentially output corresponding image data. The CCD also has top and bottom, and right and left sides. Thus, if the object is not oriented correctly with respect to the sides of the CCD, then the displayed image can be displayed in reverse. In other words, since the CCD has a fixed orientation, the object to be displayed must be correctly aligned with respect to the CCD in order to prevent the object's image from being disolaved in reverse. As shown in FIG. 2A, an object, or manuscript 21, should be placed on a manuscript table 23 so that its upper portion A' is turned toward side A of the manuscript table.

As shown in FIG. 2B, if the prior art video device is used as a camera, then head 25 of the video device is rotated to display a correct image since the top and bottom orientation of the CCD is fixed.

SUMMARY OF THE INVENTION

An important advantage of the present invention is the provision of an arrangement which substantially obviates one or more of the limitations and disadvantages of the described prior art methods. In particular, the present invention is directed towards a device for reversing an image Additional features and advantages of the invention will be set forth in the description which follows, and in part will be obvious from the description, or may be learned by practice of the invention. The objectives and other advantages of the invention may be realized and attained by the apparatus particularly pointed out in the written description and claims hereof, as well as the appended drawings.

To achieve these and other advantages and in accordance with the purpose of the invention, as embodied and broadly described, the invention comprises a device for reversing an image of an object. The device comprises means for selecting a reverse mode and means for generating a plurality of control signals. The control signal generating means outputs a down-counting signal when the reverse mode is selected. A memory stores image data when the memory receives a store-enable control signal from the control signal generating means and outputs the stored image data when the memory receives an output-enable control signal from the control signal generating means. The device also includes means for generating an address at which the image data is stored in the memory according to a control signal received from the control signal generating means. During the reverse mode, the address generating means generates an address to sequentially access the memory, beginning with a last address of the memory according to the down-counting signal.

In another aspect, the invention includes means for selecting a reverse mode and means for generating a plurality of control signals. The control signal generating means outputs a down-counting signal when the reverse mode is selected. A memory stores image data when the memory receives a store-enable control signal from the control signal generating means and outputs the stored image data when the memory receives an output-enable control signal from the control signal generating means. The device also includes means for generating an address at which the image data is stored in the memory according to a control signal received from the control signal generating means. During the reverse mode, the address generating means generates an address to sequentially access the memory, beginning with a column address which precedes the last column address of the memory according to the down-counting signal.

In another aspect, the invention includes a video system for displaying a video image of an object. The system comprises an image pickup device for transforming an optical image of the object into a corresponding analog electrical signal. An A/D converter converts the analog electrical signal into a digital signal. An image reversing device receives the digital signal from the A/D converter, selectively reverses the image data corresponding to the digital signal, and outputs the selectively reversed image data. An image processing device processes the image data received from the image reversing device, and outputs a luminance signal and a chrominance signal corresponding to the processed image data. Finally, an image output device mixes the luminance signal and the chrominance signal and outputs a corresponding complex image signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings:

FIG. 8A is a table of components of sampling signals S1 and S2 when the image is not reversed;

FIG. 8B is a table of components of sampling signals S1 and S2 when the image is reversed according to a first embodiment of the present invention;

FIG. 8C is a table of components of sampling signals S1 and S2 when the image is reversed according to a second embodiment of the present invention.

DETAILED DESCRIPTION

Embodiments of the present invention will now be described with reference to the accompanying drawings.

Figure 1:
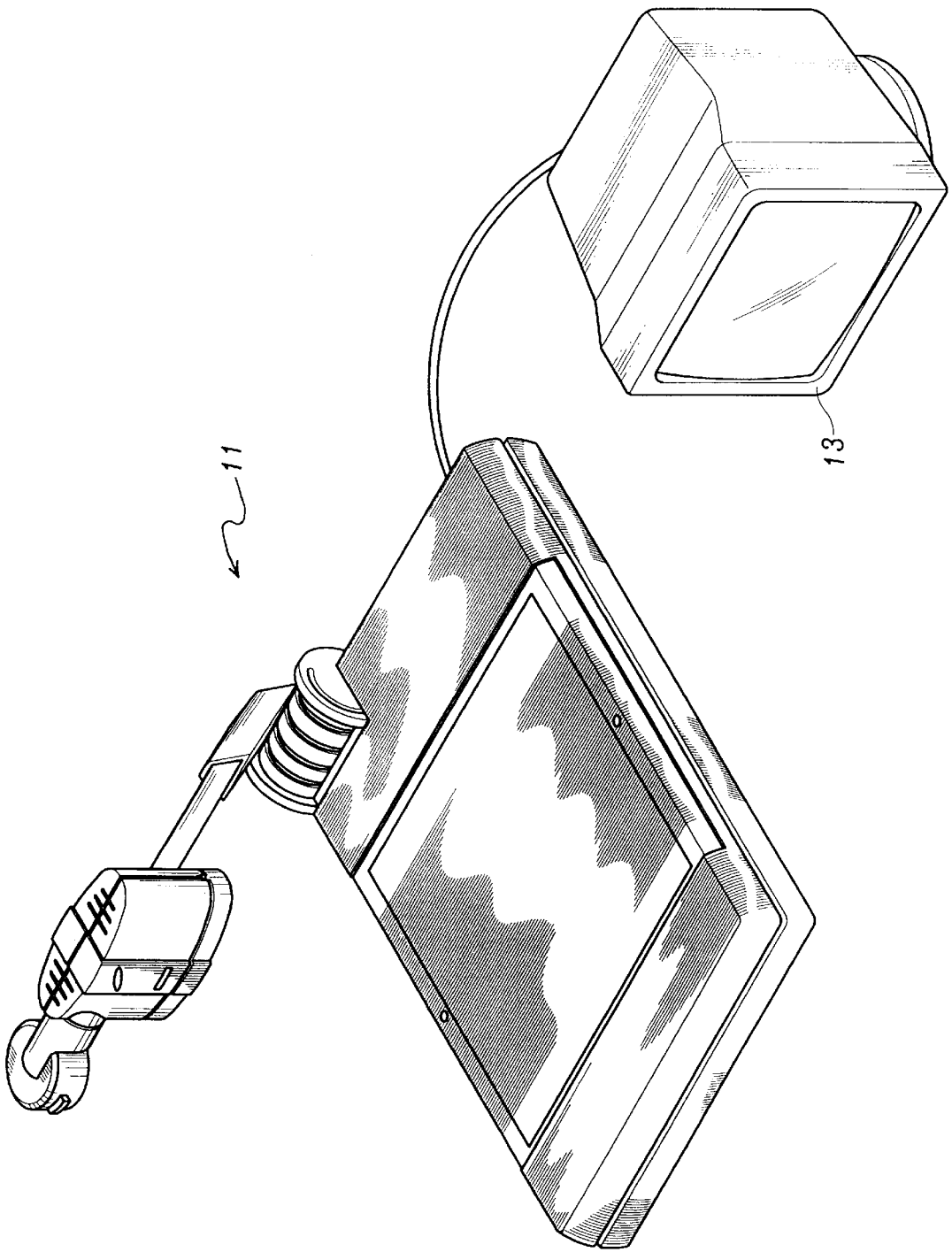
FIG. 1 is a perspective view of a video system.
Figure 2A:
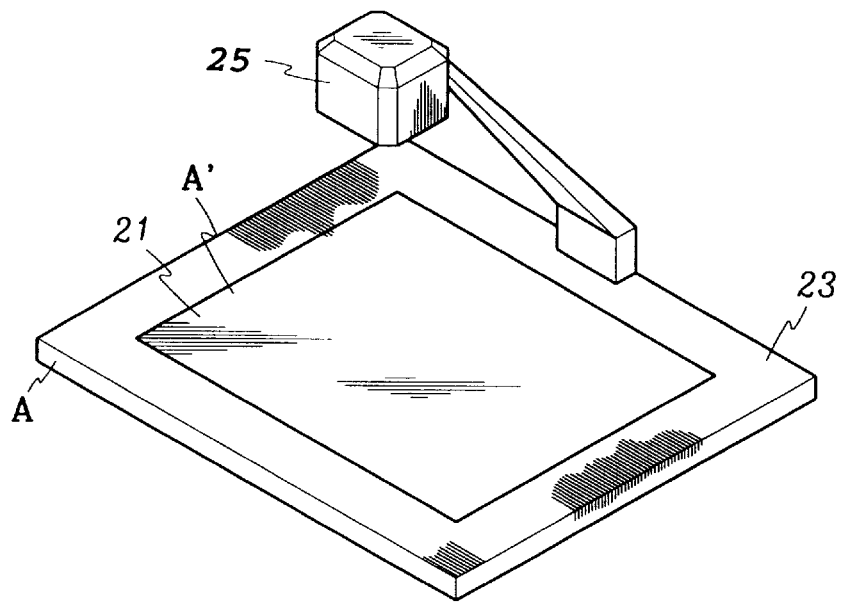
FIGS. 2A and 2B are perspective views of a prior art video device.
Figure 2B:
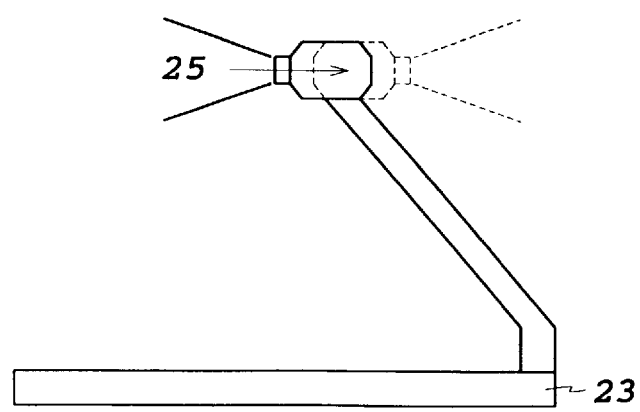

FIG. 1 is a perspective view of a video system according to the present invention. Referring to FIG. 1, a video system 11 outputs a video signal to a video display device 13, which transforms the video signal into a video image.

Figure 3:
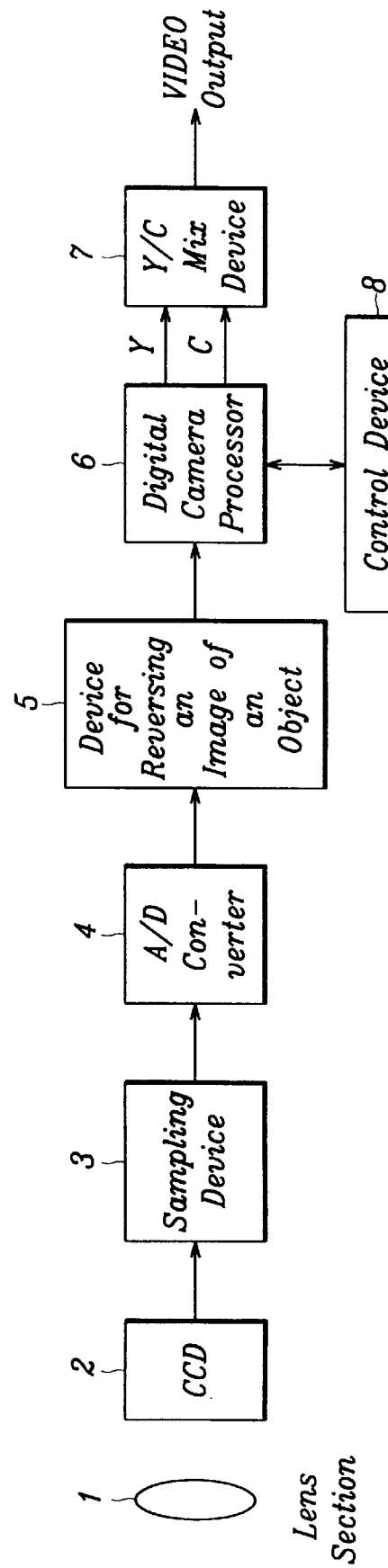
FIG. 3 is a block diagram of a video system according to a preferred embodiment of the present invention.

FIG. 3 is a block diagram of a video system according to a preferred embodiment of the present invention. Referring to FIG. 3, the device comprises a lens section 1, a CCD 2, sampling 3, an A/D converter 4, an object image reversing device 5, a digital camera processor 6, a Y/C mix device 7 and a controller device 8. Lens section 1 focuses light received from an object (not shown). CCD 2 receives the focused light and converts it into a corresponding electrical signal. Sampling device 3 performs a sample and hold operation on the electrical signal, and outputs a sampled analog signal to A/D converter 4 which converts the sampled analog signal into a digital signal representative of digital image data.

Digital Camera Processor (DCP) 6 processes the digital image data and outputs a corresponding luminance signal Y and chrominance signal C. Y/C mixing device 7 mixes the luminance signal Y and the chrominance signal C outputted from DCP 6 and outputs a complex image signal corresponding to the video system's output. In addition, the video system includes control device 8 for controlling the operation of DCP 6. The video system further includes image reversing device 5 which is preferably installed between A/D converter 4 and DCP 6. In this arrangement, reversing device 5 receives the digital image data from converter 4 and outputs processed image data to DCP 6.

CCD 2 preferably consists of 410,000 pixels. For instance, CCD 2 may have 768 pixels in the horizontal direction and 494 pixels in the vertical direction, totalling about 380,000 points of pixel data for storage in an image memory (not shown).

Figure 5:
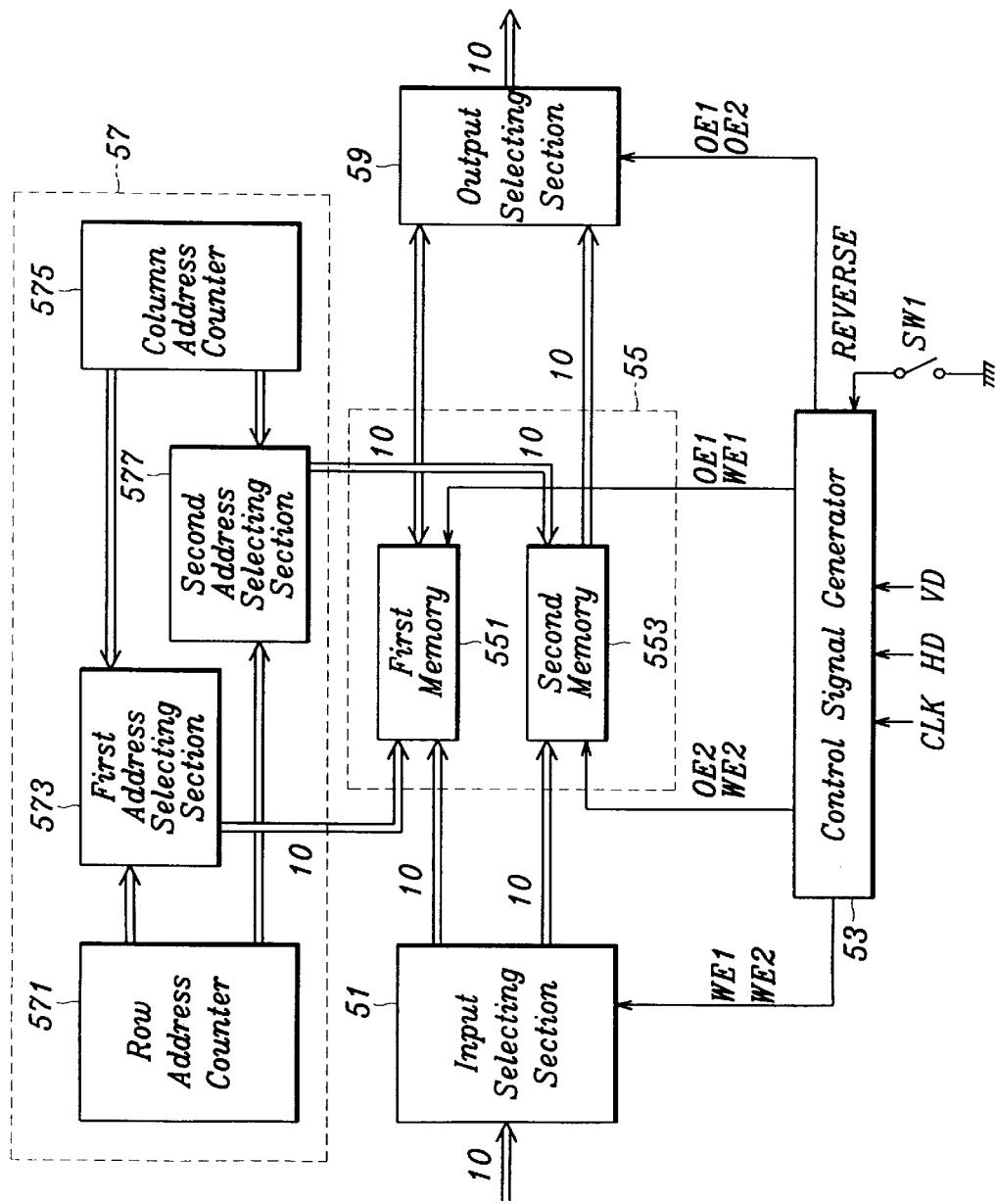
FIG. 5 is a block diagram of an image reversing device shown in FIG. 3.

FIG. 5 is a block diagram of image reversing device 5 shown in FIG. 3. Referring to FIG. 5, image reversing device 5 comprises mode switch SW1, input selecting section 51, control signal generator 53, memory 55, address generator 57, and output selecting section 59. If mode switch SW1 is turned on, then the video system enters a reverse mode. Mode switch SW1 is preferably controlled by a user who switches SW1 on when the object is not correctly oriented with respect to CCD 2. However, mode switch SW1 may be automatically controlled by receiving an output from an image recognition system. Such a system performs preprocessing on image data to determine the orientation of the image, as known to those skilled in the art.

Control signal generator 53 receives a clock signal CLK, a horizontal synchronization signal HD, a vertical synchronization signal VD, and the switching signal from switch SW1, and generates a plurality of control signals. Address generator 57 designates an area for storing and outputting the image data and outputs corresponding memory address signals to memory 55. If memory 55 receives a write-enable control signal from control signal generator 53, then memory 55 stores the image data in the area designated by the address received from address generator 57. If memory 55 receives a read-enable control signal from signal generator 53, then memory 55 outputs the image data stored at the address received from address generator 57.

Input selecting section 51 receives image data from A/D converter 4 and outputs the image data to memory 55 in accordance with a control signal received from control signal generator 53. Input selecting section 51 preferably consists of a D flip-flop. Output selecting section 59 receives image data from memory 55 and outputs the image data to DCP 6 in accordance with a control signal received from control signal generator 53.

Memory 55 further comprises a first memory 551 and a second memory 553. Memory 55 can process 10 bits of data and store 763 (horizontal)×494 (vertical) pixels of data per each bit. The number of pixel data used in practice is preferably 768 (horizontal)×494 (vertical). However, only 768 (horizontal)×247 (vertical) pixels of data are stored in each of the memories 551 and 553 since the image data is processed in even and odd fields. A column address and a row address of memory 55 are each preferably 10 bits in length; the column address ranges from a value of 0 to 767, and the row address ranges from a value of 0 to 246.

Address generator 57 further comprises a row address counter 571, a first address selecting section 573, a column address counter 575, and a second address selecting section 577. Row address counter 571 counts a row address according to a control signal (not shown) received from control signal generator 53. Column address counter 575 counts a column address according to a control signal (not shown) received from control signal generator 53. First address selecting section 573 receives the row address from counter 571 and the column address from counter 575 and outputs a corresponding row/column address to first memory 551. Second address selecting section 577 also receives the row and column addresses from counters 571 and 575, respectively, and outputs a corresponding row/column address to second memory 553.

Figure 4A:
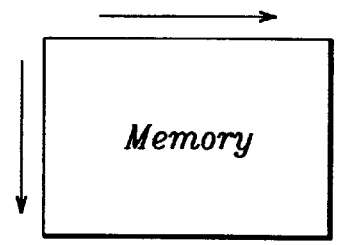
FIGS. 4A and 4B are diagrams of a principle of reversing an image.
Figure 4B:
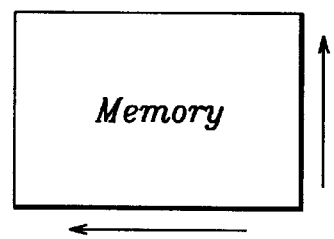

The operation of image reversing device 5 will now be described. A frame of image data is picked up by CCD 2 (FIG. 3) and stored in memory 55. If the image data is not to be reversed by image reversing device 5, then the image data stored in the first address of memory 55 is to be read first, as shown in FIG. 4A. If the top and bottom orientation of the image data is to be reversed, then, as shown in FIG. 4B, the image data stored in the last address of the memory is to be read first.

In order to output a moving video image in real time, image data has to be written into and read out of memory 55 at the same time since the timing of the video signal barely allows enough time for a read and write operation to be performed simultaneously. Therefore, memories 551 and 553 are used in the preferred embodiment of the present invention. If image data is being stored in first memory 551, the image data stored in second memory 553 is to be read. Conversely, if image data is being stored in second memory 553, the image data stored in first memory 551 is to be read.

As described above, the optical image incident to lens section 1 is converted into an electrical signal by CCD 2. Sampling device 3 then samples the electrical signal at a rate of 14.318 MHz and outputs the sampled signal to A/D converter 4. A/D converter 4 digitizes the sampled signal into a 10 bit digital image signal and outputs the digital image signal to image reversing device 5. Accordingly, one bit of data is stored in memory 55 for every 69.8 ns since the digital signal outputted from A/D converter 4 has a frequency of 14.318 MHz.

Control signal generator 53 sets either a normal mode or a reverse mode depending on the state of mode switch SW1. In response to the state of switch SW1, generator 53 outputs the control signals for processing the reading and writing of the image data. For instance, control signal generator 53 outputs to input selecting section 51 a corresponding control signal every period in order to alternately store image data in first memory 551 and second memory 553.

Figure 6:
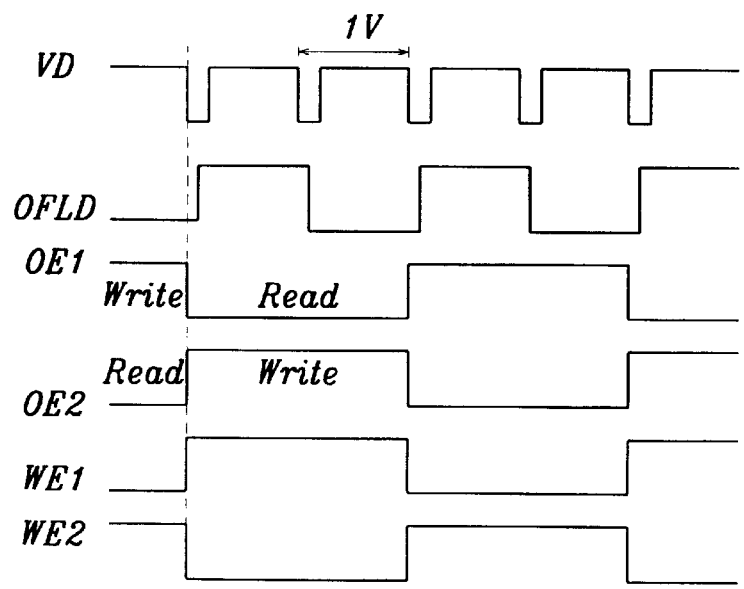
FIG. 6 is a timing diagram of control signals which operate the image reversing device shown in FIG. 3.

If image data is to be stored in first memory 551 and image data is to be output from second memory 553, then control signal generator 53 outputs first write enable signal WE1 at a low state and second write enable signal WE2 at a high state. As seen in FIG. 5, the signals WE1 and WE2 are also respectively provided to first memory 551 and second memory 553. FIG. 6 is a timing diagram of the control signals output by control signal generator 53. At the same time these signals are output, input selecting section 51 outputs image data to first memory 551 and stops any input of image data to second memory 553.

Control signal generator 53 then drives address generator 57 for designating an area for writing or reading the image data. In the normal mode, row address counter 571 and column address counter 575 perform up-counting from the first address of memory 55 according to the control signal outputted from control signal generator 53. Counters 571 and 575 then output the corresponding start address (0,0) to address selecting sections 573 and 577.

First address selecting section 573 combines the row address outputted from row address counter 571 and the column address outputted from column address counter 575. First memory 551 stores the image data outputted from input selecting section 51 at the combined address designated by first address selecting section 573. Second address selecting section 577 combines the row address outputted from row address counter 571 and the column address outputted from column address counter 575, so that image data stored at the combined address in second memory 553 can be outputted. When second write enable signal WE2 at a high state and second output enable signal OE2 at a low state are output by generator 53, second memory 553 successively outputs the image data stored at the address designated by address selecting section 577.

Control signal generator 53 separately selects the row address and the column address according to horizontal and vertical synchronization signals HD and VD, respectively. If mode switch SW1 is turned on, control signal generator 53 sets the reverse mode and outputs a corresponding control signal for performing the operation of reversing the image. In the reverse mode, control signal generator 53 sets the first initial value for performing a down-counting and outputs a down counting signal. The down-counting signal drives address counters 571 and 575, which down-count from the first initial value set according to clock signal CLK and output a corresponding address.

In a first embodiment, when image reversing device 5 is operating in a reverse mode, the initial value in an odd field is set to (767, 246) and the initial value in an even field is set to (767, 493). Accordingly, the image data in the odd and even fields are not switched with one another when the image corresponding to one frame is output after storage in memory 55. Therefore, in the odd field, row address counter 571 performs down-counting from the value of 246 and the column address counter 575 performs down-counting from the value of 767. In the even field, the row address counter 571 performs down-counting from the value of 493 and the column address counter 575 performs down-counting from the value of 767. Thus, first memory 551 successively outputs image data beginning with image data stored in the last address (767, 246), as shown in FIG. 4B.

First memory 551 outputs the image data to output selecting section 59. At this time, control signal generator 53 outputs to selecting section 59 first output enable signal OE1 in a low state so that image data outputted from first memory 551 is Outputted to DCP 6. As first output enable signal OE1 is output, output selecting section 59 outputs to DCP 6 the image data outputted from first memory 551 and stops the output of image data from second memory 553. DCP 6 processes the image data and outputs corresponding chrominance and luminance signals C and Y as a complex signal to Y/C mixing device 7. As shown in FIG. 1, the complex signal is output from video system 11 and transformed into a video image through video display device 13.

As mentioned above, when the image is reversed, control signal generator 53 alternates outputting the up-counting signal and the down-counting signal each frame. That is, after first memory 551 outputs the image data, image data is input to first memory 551. Therefore, when operating under the reverse mode, control signal generator 53 alternately outputs to address generator 57 the up-counting signal and the down-counting signal each frame so that the writing operation and the reading operation of memory 55 is alternately performed.

According to a first embodiment of the invention, luminance signal Y outputted from DCP 6 in the normal mode, is the same as signal Y output in the reverse mode. However, R-Y and B-Y of a color-difference signal of the chrominance signal of the reverse mode, are alternately output and their output order is switched in the odd field. Therefore, a normal color is produced in the even field and a complimentary color is produced in the odd field.

Figure 7:
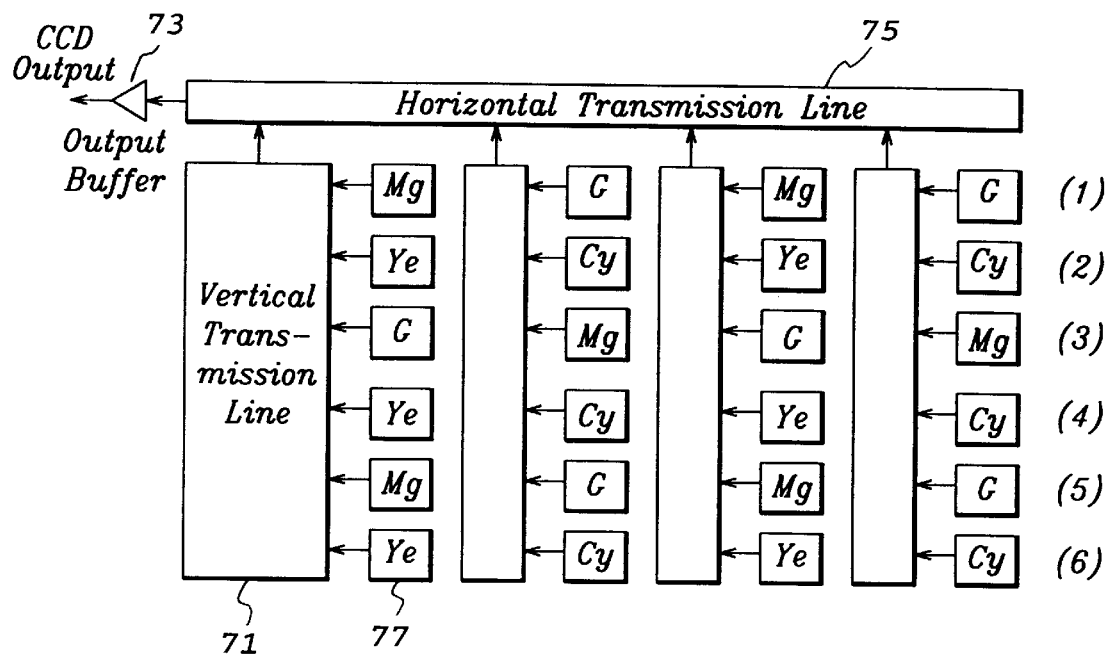
FIG. 7 is a diagram of a color filter of a CCD shown in FIG. 3.

FIG. 7 is a diagram illustrating a color filter used in CCD 2 of FIG. 3. Referring to FIG. 7, the chrominance signal C is produced by combining signals outputted from color filters 77, which correspond to pixels of CCD 2. The signals (1)-(4) are output to vertical transmission line 71 according to a pixel transmission pulse and then output to horizontal transmission line 75 according to a horizontal transmission pulse. The signals transmitted to horizontal transmission line 75 are output in the order (Mg+Ye), (G+Cy), (G+Ye), (Mg+Cy) through output buffer 73 according to a pixel clock in the odd field.

CCD 2 outputs the signal to sampling device 3 which outputs corresponding sampling signals S1 and S2. The sampling signals S1 and S2 are formed of four color components, such as a green (G), cyan (Cy), magneta (Mg), and yellow (Ye), according to the construction of the color filter of CCD 2 and the particular color component. As shown in FIG. 8A, the color component is changed every 1 H period.

Figure 9:
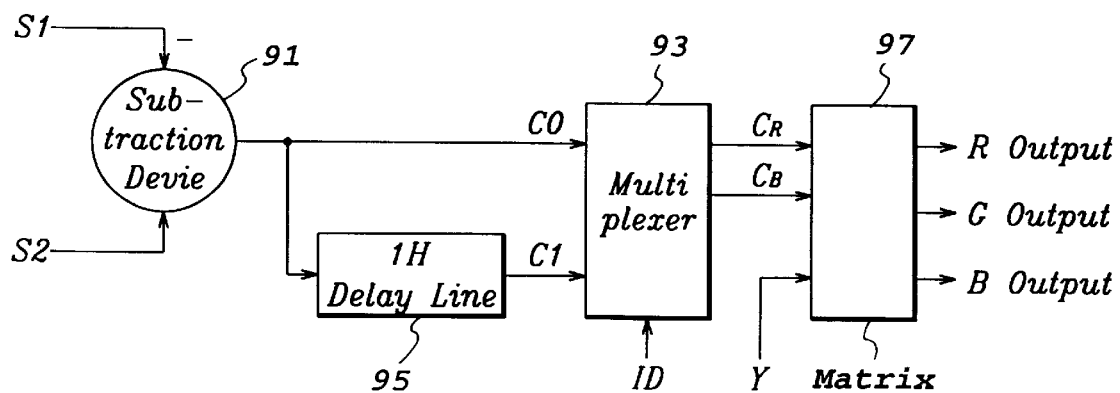
FIG. 9 is a block diagram illustrating a color matrix in accordance with a preferred embodiment of the present invention.

FIG. 9 is a block diagram of a color matrix circuit according to a preferred embodiment of the invention. A color matrix circuit is used to form a red (R) signal, a green (G) signal, and a blue (B) signal, needed for representing a color of the image. Referring to FIG. 9, a subtraction device 91 subtracts signal S1 from signal S2 and outputs the resulting signal C0 to a multiplexer 93. An R component and a B component of signal C0 are alternately output every 1 H period.

Signal C0 in period 0 H of the odd field is defined by equation 1:

$$C0 = S2 - S1 = (Mg + Ye) - (G + Cy) \qquad (1)$$
$$= (R + B + R + G) - (G + G + B)$$
$$= 2R - G$$

Signal C0 in period 1 H of the even field is defined by equation 2:

$$C0 = S2 - S1 = (G + Ye) - (Mg + Cy) \quad (2)$$
$$= (G + R + G) - (R + B + G + B)$$
$$= -(2B - G)$$

Accordingly, 2R–G and –(2B–G) are alternately outputted every 1 H period.

A delay line 95 receives signal C0 and outputs signal C1 corresponding to signal C0 delayed by 1 H period. A multiplexer 93 receives signals C0 and C1 and successively outputs every period signal $C_R$ consisting of a 2R–G component and signal $C_B$ consisting of a 2B–G component. A color matrix 97 receives signals $C_R$, $C_B$, and Y, and combines and transforms them in order to output signals R, G and B.

Signal Y is the luminance signal and is composed of signals S1 and S2, as defined by equation 3:

$$Y = S1 + S2 = (G + Cy) + (Mg + Ye) \quad \text{(period } 0H) \quad (3)$$
$$= (Mg + Cy) + (G + Ye) \quad \text{(period } 1H)$$
$$= 2R + 3G + 2B$$

Signal C0 in period 0 H' of the even field is defined by equation 4:

$$C0 = S2 - S1 = (Ye + G) - (Cy + Mg) \quad (4)$$
$$= (R + G + G) - (B + G + R + B)$$
$$= G - 2B$$
$$= -(2B - G)$$

Signal C0 in period 1 H' of the even field is defined by equation 5:

$$C0 = S2 - S1 = (Ye + Mg) - (Cy + G) \quad (5)$$
$$= (R + G + R + B) - (B + G + G)$$
$$= 2R - G$$

Signal Y in the even field is defined by equation 6:

$$Y = S1 + S2 = (Cy + Mg) + (Ye + G) \quad \text{(period } 0H') \quad (6)$$
$$= (Cy + G) + (Ye + Mg) \quad \text{(period } 1H')$$
$$= 2R + 3G + 2B$$

As shown by equations 1, 2, 4 and 5, signal C0 of the chrominance signal is changed every field. However, luminance signal Y is the same regardless of the field.

FIG. 8B illustrates an arrangement of the CCD color filter in the reverse mode. If the chrominance signal and the luminance signal are combined on the basis of FIG. 8B, signal C0 in period 0 H of the odd field is defined by equation 7:

$$C0 = S2 - S1 = (Cy + Mg) - (Ye + G) \quad (7)$$
$$= (G + B + R + B) - (R + G + G)$$
$$= 2B - G$$

Signal C0 in period 1 H of the odd field is defined by equation 8:

$$C0 = S2 - S1 = (Cy + G) - (Ye + Mg) \quad (8)$$
$$= (G + B + G) - (R + G + R + B)$$
$$= -(2R - G)$$

Signal Y in the odd field is defined by equation 9:

$$Y = S1 + S2 = (Ye + G) + (Cy + Mg) \quad \text{(period } 0H) \quad (9)$$
$$= (Ye + Mg) + (Cy + G) \quad \text{(period } 1H)$$
$$= 2R + 3G + 2B$$

Signal C0 in period 0 H' of the even field is defined by equation 10;

$$C0 = S2 - S1 = (Mg + Cy) - (G + Ye) \quad (10)$$
$$= (R + B + G + B) - (G + R + G)$$
$$= 2B - G$$
$$= -(-(2B - G))$$

Signal C0 in period 1 H' of the even field is defined by equation 11:

$$C0 = S2 - S1 = (G + Cy) - (Mg + Ye) \quad (11)$$
$$= (G + B + G) - (R + B + R + G)$$
$$= G - 2R$$
$$= -(2R - G)$$

Signal Y in the even field is defined by equation 12:

$$Y = S1 + S2 = (G + Ye) + (Mg + Cy) \quad \text{(period } 0H') \quad (12)$$
$$= (Mg + Ye) + (G + Cy) \quad \text{(period } 1H')$$
$$= 2R + 3G + 2B$$

As shown by equations 3, 6, 9 and 12, luminance signal Y is the same in both the reverse mode and the normal mode, regardless of the field. However, a polarity of chrominance signal C0 output in the odd field of the reverse mode is opposite to that which is output in the odd field of the normal mode. Also, chrominance signals C0 output in periods 0 H and 1 H of the normal mode are switched when output in periods 0 H and 1 H of the reverse mode. Also, the chrominance signal outputted in the even field of the reverse mode is opposite of that in the normal mode. Accordingly, signals R and B are switched, and the complimentary color is generated in the monitor.

The changes in the chrominance signal C0 described above, according to a first embodiment of the invention, are shown below in Tables 1 and 2. Specifically, Table 1 shows the component of chrominance signal C0 in an odd field, while Table 2 shows the component of the chrominance signal C0 in an even field.

TABLE 1

|    | normal mode       | reverse mode      |
|----|-------------------|-------------------|
| 0H | 2R-G (equation 1) | 2B-G (equation 7) |
| 1H | -(2B-G) (equation 2) | -(2R-G) (equation 8) |

TABLE 2

|     | normal mode       | reverse mode      |
|-----|-------------------|-------------------|
| 0H' | -(2B-G) (equation 4) | 2B-G (equation 10) |
| 1H' | 2R-G (equation 5) | -(2R-G) (equation 11) |

In the first embodiment of the invention, chrominance signals C0 output in periods 0 H and 1 H are exchanged in the odd field of the reverse mode. Accordingly, signals $C_R$ and $C_B$ output from multiplexer 93 of DCP 6, consist of components B and R, respectively. In this way, component B is switched with component R on the screen.

In a second embodiment of the present invention, in order to produce a normal color on the screen (R and B are not switched) in the reverse mode, chrominance signal C0 is the same, regardless of the field and mode. Specifically, a polarity of a line index signal ID is changed in only an odd field of the reverse mode so that chrominance signal C0 is the same for each period. The polarity of line index signal ID is changed by setting a value of a register in DCP 6.

An arrangement of the color filter of CCD 2 is also changed to keep the polarity of chrominance signal C0 the same for each period. Thus, when memory 55 outputs sampling signals S1 and S2 in the reverse mode, signals corresponding to the last pixel line 768 of the color filter of CCD 2 are deleted. Signals corresponding to the next pixel line 767 are output, thus allowing for chrominance signal C0 to have the same polarity for every period.

The operation of the image reversing device 5, according to the second embodiment of the present invention, will now be described. As mentioned above in the first embodiment, the image data is stored in memory 55. If the reverse mode is selected, control signal generator 53 sets the second initial value for performing down-counting to reverse the image data stored in first memory 551. In order to delete image data corresponding to last line 768 of the color filter of CCD 2, the second initial value for performing down-counting is set to (766, 247). Accordingly, column address counter 575 performs down counting from a value of 766 and row address counter 571 performs down-counting from the second initial value of 247.

When control signal generator 53 outputs first write enable signal WE1 at a high state and first output enable signal OE1 at a low state, first memory 551 successively outputs image data beginning with address (766,247), as shown in FIG. 4B. This address corresponds to the address outputted from the address counters 575 and 571. Accordingly, image data stored at address 767 of first memory 551 is not outputted. Thus, the signal corresponding to the last line 768 of the color filter of CCD 2 is not output.

FIG. 8C illustrates an arrangement of the color filter of CCD 2 when the sampling signal corresponding to the last line 768 is deleted in the reverse mode. If the chrominance signal and the luminance signal are combined on the basis of FIG. 8C, signal C0 in period 0 H of the odd field is defined by equation 13:

$$C0 = S2 - S1 = (Ye + G) - (Cy + Mg) \quad (13)$$
$$= (R + G + G) - (G + B + R + B)$$
$$= G - 2B$$
$$= -(2B - G)$$

Signal C0 in period 1 H of the odd field is defined by equation 14:

$$C0 = S2 - S1 = (Ye + Mg) - (Cy + G) \quad (14)$$
$$= (R + G + R + B) - (G + B + G)$$
$$= 2R - G$$

Signal Y in the odd field is defined by equation 15:

$$Y = S1 + S2 = (Cy + Mg) + (Ye + Mg) \text{ (period } 0H) \quad (15)$$
$$= (Cy + G) + (Ye + Mg) \text{ (period } 1H)$$
$$= 2R + 3G + 2B$$

Signal C0 in period 0 H' of the even field is defined by equation 16:

$$C0 = S2 - S1 = (G + Ye) - (Mg + Cy) \quad (16)$$
$$= (G + R + G) - (R + B + G + B)$$
$$= G - 2B$$
$$= -(2B - G)$$

Signal C0 in period 1 H' of the even field is defined by equation 17:

$$C0 = S2 - S1 = (Mg + Ye) - (G + Cy) \quad (17)$$
$$= (R + B + R + G) - (G + B + G)$$
$$= 2R - G$$

Signal Y signal in the even field is defined by equation 18:

$$Y = S1 + S2 = (Mg + Cy) + (G + Ye) \text{ (period } 0H') \quad (18)$$
$$= (G + Cy) + (Mg + Ye) \text{ (period } 1H')$$
$$= 2R + 3G + 2B$$

As shown by equations 13–18, when the signal corresponding to the last line of the color filter of CCD 2 is deleted, the polarity of chrominance signal C0 in the reverse mode is the same as that in the normal mode.

Memory 55 then outputs the image data to DCP 6, which processes the image data according to line index signal ID output from control device 8. DCP 6 then outputs chrominance signal C and luminance signal Y. In order to change the polarity of line index signal ID of DCP 6 in the reverse mode, control device 8 sets the value of a register in DCP 6.

Accordingly, the multiplexer of DCP 6 in the reverse mode exchanges signal C0 output in period 0 H with signal C1 output in period 1 H. Thus, chrominance signal C0 is the same as that in the normal mode.

The components of chrominance signal C0 output according to the second embodiment of the present invention, are shown below in Tables 3 and 4. Specifically, Table 3 shows the component of chrominance signal C0 in the odd field. Table 4 shows the component of chrominance signal C0 in the even field.

TABLE 3

|    | normal mode         | reverse mode          |
|----|---------------------|-----------------------|
| 0H | 2R-G (equation 1)   | -(2B-G) (equation 13) |
| 1H | -(2B-G) (equation 2)| 2R-G (equation 14)    |

TABLE 4

|     | normal mode          | reverse mode          |
|-----|----------------------|-----------------------|
| 0H' | -(2B-G) (equation 4) | -(2B-G) (equation 16) |
| 1H' | 2R-G (equation 5)    | 2R-G (equation 17)    |

As described above, image reversing device 5 selectively reverses the top and bottom orientation of the displayed image, thereby improving the convenience in using the video system. Further, according to the present invention, the video system produces video images having a normal color in a reverse mode and does not require aligning the orientation of a manuscript with that of CCD 2.

It will be apparent to those skilled in the art that various modifications and variations can be made in the method and system of the present invention without departing from the spirit or scope of the invention. The present invention covers the modifications and variations of this invention provided they come within the scope of the appended claims and their equivalents.

What is claimed is:

1. A device for reversing an image of an object, comprising:

means for selecting a reverse mode;

means for generating a plurality of control signals, and for outputting a down-counting signal when the reverse mode is selected;

a memory for storing image data when the memory receives a store-enable control signal from the control signal generating means and for outputting the stored image data when the memory receives an output-enable control signal from the control signal generating means; and means for generating an address at which the image data is stored in the memory according to a control signal received from the control signal generating means, and, during the reverse mode, generating an address to sequentially access the memory, beginning with a column address which precedes a last column address of the memory according to the down-counting signal.

2. The device of claim 1, wherein:

the control signal generating means sets a normal mode when the reverse mode is not selected, and outputs an up-counting signal corresponding to the normal mode; and the address generating means outputs, during the normal mode, an address to the memory to sequentially access the memory beginning with a first address of the memory according to the up-counting signal.

3. The device of claim 1, wherein the memory comprises:

a first memory for storing the image data applied in an odd field; and a second memory for storing the image data applied in an even field.

4. The device of claim 3, further comprising:

an input selecting means for selectively storing image data in either the first memory or the second memory; and an output selecting means for selectively outputting image data from either the first memory or the second memory.

5. The device of claim 4, wherein the input selecting means stores the image data in the memory which the control signal generating means selects for storage.

6. The device of claim 4, wherein the output selecting means outputs the image data in the memory which the control signal generating means selects for outputting.

7. The device of claim 2, wherein the control signal generating means alternately outputs the up-counting signal and the down-counting signal each frame, such that the memory alternates between storing and outputting image data.

8. The device of claim 3, wherein the control signal generating means sets an initial value of the down-counting signal for each field.

9. The device of claim 3, wherein the address generating means further comprises:

a row address counter for counting a row address when the row address counter is driven by a control signal from the control signal generating means;

a column address counter for counting a column address when the column address counter is driven by a control signal from the control signal generating means;

a first address selecting means for outputting an address consisting of the row address from the row address counter and the column address from the column address counter for accessing the first memory; and a second address selecting means for outputting an address consisting of the row address from the row address counter and the column address from the column address counter for accessing the second memory.

10. A video system for displaying a video image of an object, comprising:

an image device for transforming an optical image of the object into a corresponding analog electrical signal;

an A/D converter for converting the analog electrical signal into a digital signal;

an image reversing device for receiving the digital signal from the A/D converter, selectively reversing the image data corresponding to the digital signal, and outputting the selectively reversed image data;

an image processing device for processing the image data received from the image reversing device, and outputting a luminance signal and a chrominance signal corresponding to the processed image data; and an image output device for mixing the luminance signal and the chrominance signal and outputting a corresponding complex image signal, wherein the image processing device corrects a color component of the complex image signal when the image data is selectively reversed such that the color component when the image data is reversed is the same as when the image data is not reversed.

11. The system of claim 10, wherein the image reversing device further comprises:

means for selecting a reverse mode;

means for generating a plurality of control signals, and for outputting a down-counting signal when the reverse mode is selected;

a memory for storing image data when the memory receives a store-enable control signal from the control signal generating means and for outputting the stored image data when the memory receives an output-enable control signal from the control signal generating means; and means for generating an address at which the image data is stored in the memory according to a control signal received from the control signal generating means, and, during the reverse mode, generating an address to sequentially access the memory, beginning with a last address of the memory according to the down-counting signal.

12. The system of claim 10, wherein the image reversing device further includes a memory for storing image data, and wherein the image reversing device outputs image data beginning with image data stored at a last address of the memory.

13. The system of claim 10, wherein the image reversing device further comprises:

means for selecting a reverse mode;

means for generating a plurality of control signals, and for outputting a down-counting signal when the reverse mode is selected;

a memory for storing image data when the memory receives a store-enable control signal from the control signal generating means and for outputting the stored image data when the memory receives an output-enable control signal from the control signal generating means; and means for generating an address at which the image data is stored in the memory according to a control signal received from the control signal generating means, and, during the reverse mode, generating an address to sequentially access the memory, beginning with a column address which precedes a last column address of the memory according to the down-counting signal.

14. The system of claim 10, further comprising:

a control device for controlling operation of the image processing device;

wherein the image processing device further comprises a register for setting a polarity of a line index signal; and wherein the control device outputs the line index signal for processing the image data to the image processing device, and changes the value of the register when the image reversing device is selected to reverse an image.

15. The system of claim 11, wherein the memory comprises:

a first memory for storing the image data applied in an odd field; and a second memory for storing the image data applied in an even field.

16. The system of claim 15, wherein the image processing devices switches the chrominance signal of the processed image data in the odd field during the reverse mode such that a blue color component of the complex image signal is switched with a red color component of the complex image signal.

* * * * *

UNITED STATES PATENT AND TRADEMARK OFFICE
CERTIFICATE OF CORRECTION

PATENT NO. : 5,969,773
DATED : October 19, 1999
INVENTOR(S) : Jae-Hee IM

It is certified that error appears in the above-identified patent and that said Letters Patent is hereby corrected as shown below:

Claim 10, col. 12, line 49, "image device" should read --image pickup device--.

Claim 16, col. 14, line 29, "devices" should read --device--.

Signed and Sealed this

Twelfth Day of September, 2000

Attest:

Q. TODD DICKINSON

*Attesting Officer*          *Director of Patents and Trademarks*